G. W. STEWART.
TIRE CARRIER.
APPLICATION FILED MAY 5, 1921.
1,424,601.
Patented Aug. 1, 1922.
3 SHEETS—SHEET 1.
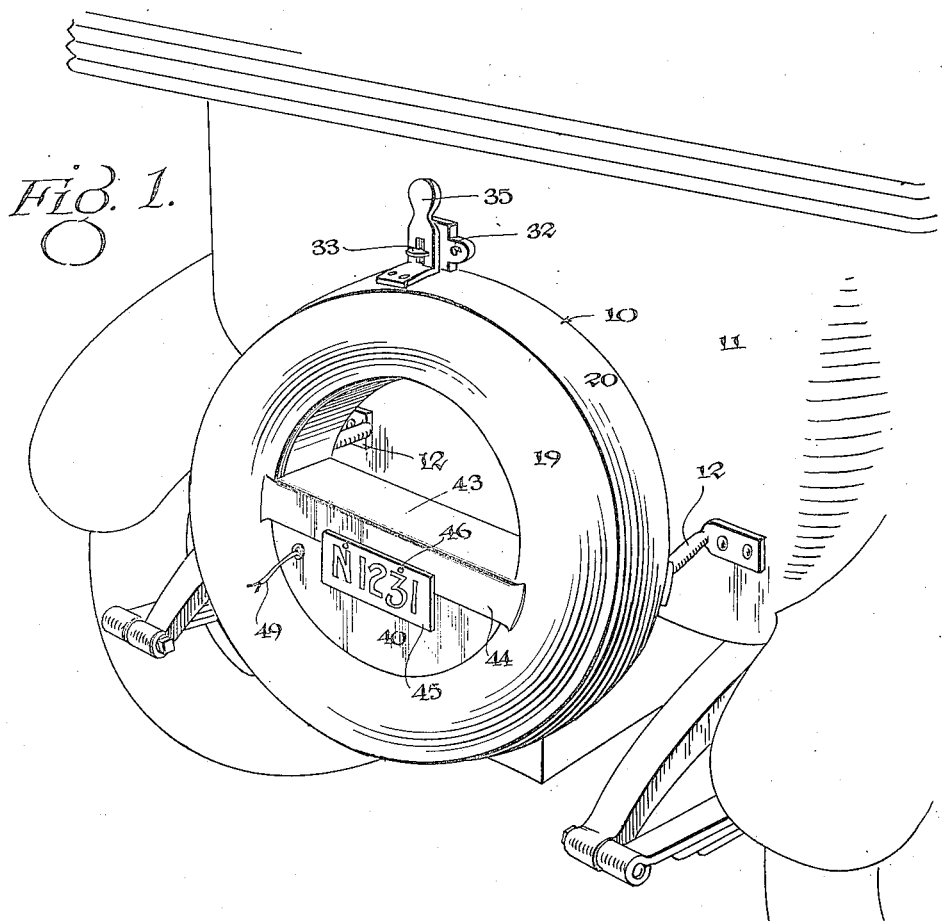
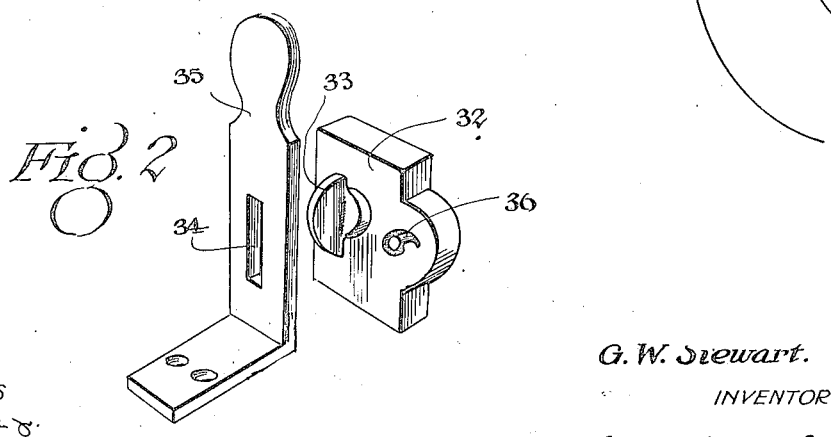

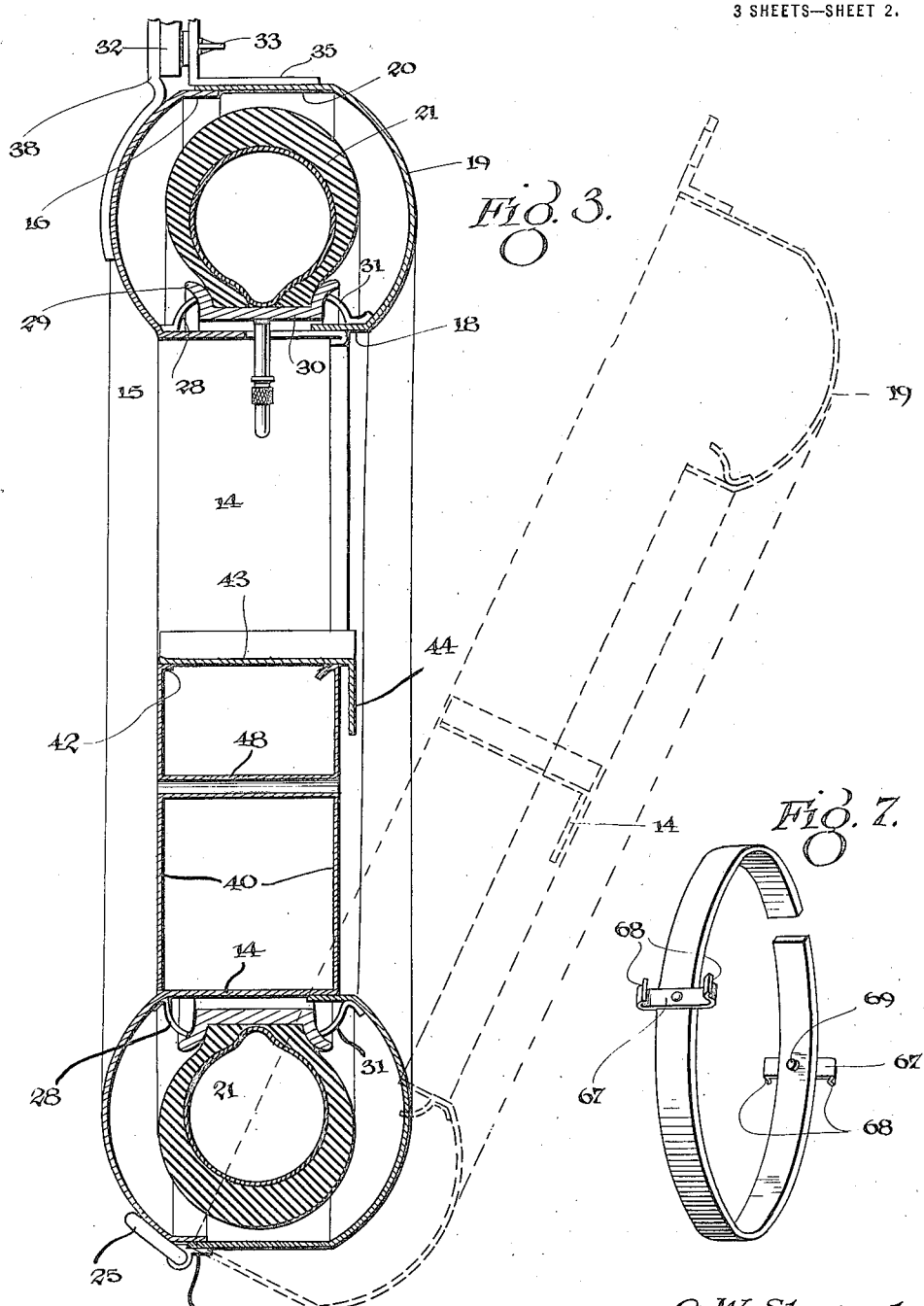

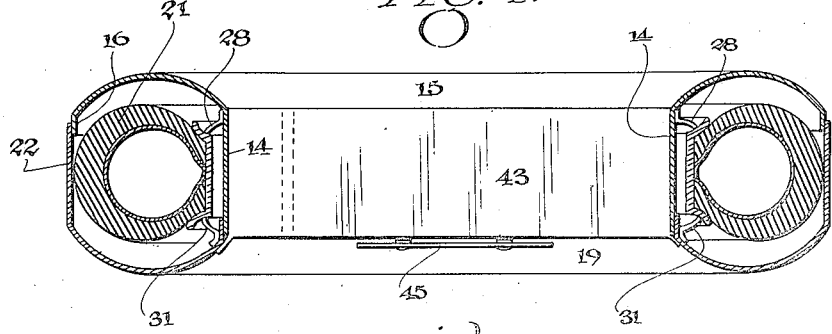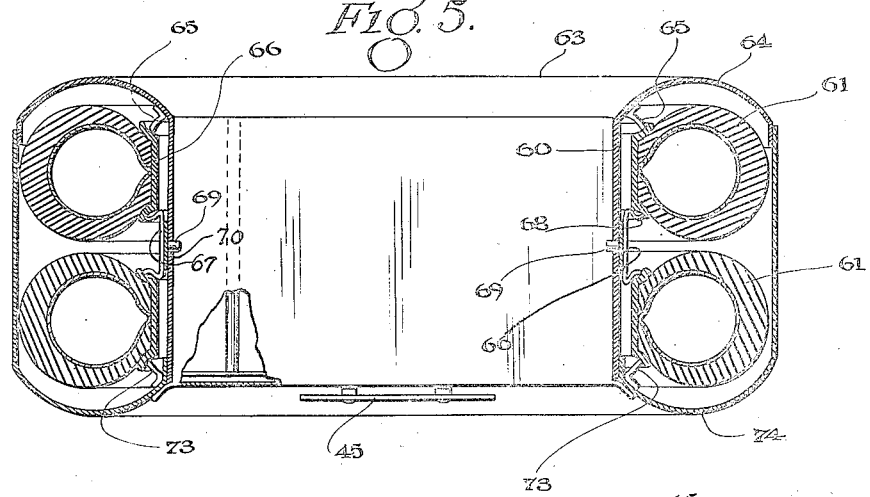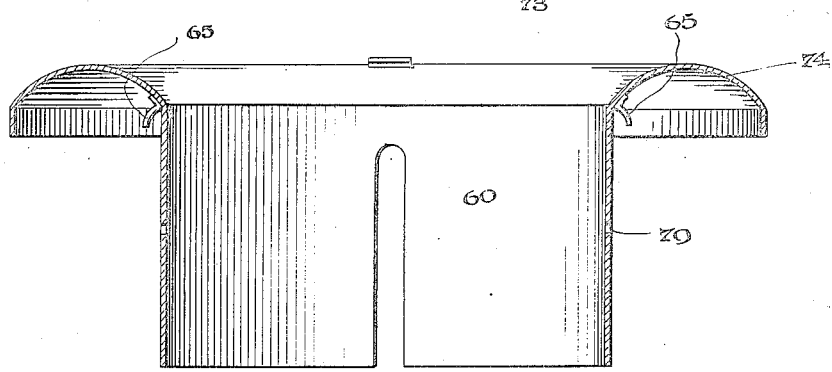

UNITED STATES PATENT OFFICE.

GEORGE W. STEWART, OF LOUGHMAN, FLORIDA.

TIRE CARRIER.

1,424,601. Specification of Letters Patent. Patented Aug. 1, 1922.

Application filed May 5, 1921. Serial No. 466,907.

*To all whom it may concern:*

Be it known that I, GEORGE W. STEWART, a citizen of the United States, and a resident of Loughman, and county of Polk and State of Florida, have invented certain new and useful Improvements in Tire Carriers, of which the following is a specification.

This invention is a tire carrier for use on motor vehicles.

An important object of this invention is to provide a tire carrier having novel means for carrying a tire and supporting the same in such a manner that the tire is prevented from chafing.

A further object of the invention is to provide a tire carrier for motor vehicles having a compartment which is automatically opened when the carrier is swung to open position, whereby the tire operating tools are exposed simultaneously with the exposure of the tire.

Another object is to provide a tire carrier having novel means whereby the license tag and the illuminating means for the same may be supported in a highly conspicuous position.

Other objects and advantages of the invention will be apparent during the course of the following description.

In the accompanying drawings forming a part of this application and in which like numerals are employed to designate like parts throughout the same, Figure 1 is a perspective of the improved tire carrier applied.

Figure 2 is a group perspective of the lock embodied in the invention.

Figure 3 is a vertical sectional view through the tire carrier, the same being shown open in dotted lines.

Figure 4 is a horizontal sectional view through the improved carrier.

Figure 5 is a horizontal sectional view through a modified form of the invention.

Figure 6 is a sectional view through a portion of the carrier illustrated in Figure 5.

Figure 7 is a perspective of a retaining ring embodied in the form of the invention illustrated in Figures 5 and 6.

In the drawings the numeral 10 generally designates the improved tire carrier adapted to be connected to the body 11 of the vehicle by means of brackets 12 or the like. The improved tire carrier embodies an annulus 14 having a transversely curved side wall 15 terminating in an outwardly directed annular flange 16 arranged in spaced relation to the annulus 14. The brackets 12 may be of any desired type and are secured to the side wall 15 so as to hold the annulus 14 and the said side wall in a more or less stationary position with relation to a second annulus 18 having a transversely curved side wall 19 terminating in an inwardly directed annular flange 20 which as illustrated in Figure 3 overlaps the annular flange 16 so as to effectively conceal a tire 21 which may be confined within the carrier.

The side walls 19 are hingedly connected to the stationary portion of the carrier by means of a hinge strap 24 connected to a loop-shaped hinge member 25 soldered or otherwise secured to the lower portion of the stationary side walls 19.

With reference to Figure 3 it will be observed that the annulus 14 is provided adjacent the stationary side wall with an annular series of tongues 28 which engage the adjacent flange 29 of a metallic rim 30. The annulus 18 which overlaps the annulus 14 is also provided with an annular series of inwardly directed longitudinal curved spring tongues 31 which engage the adjacent flange 29 of the rim so as to yieldably hold the rim in position. By thus holding the rim in position, the side walls and the crown of the tire are spaced from the adjacent portions of the carrier so that the vibrations of the vehicle will not result in chafing of the tire. Further, the spring tongues 28 and 31 which support the tire in such a manner that the same is prevented from rattling due to the movement of the vehicle.

Means for locking the movable section of the carrier to the stationary section includes a lock 32 having a key-controlled bolt or latch 33 adapted to be extended through the opening 34 in a hasp 35 carried by the upper side of the annular flange 20. The lock 30 is formed with an opening 36 adapted for the reception of a key for actuating the spring latch or bolt 33. When the movable section of the carrier is swung to its closed position as illustrated in full lines in Figure 3, the member 33 is passed through the opening 34 in the hasp 35 and is subsequently given a half turn whereby the member 33 is locked to the hasp. The lock 32 may be supported by means of an attaching strap 38 carried by the stationary side wall.

The lower portion of the annulus 15 is provided with upstanding spaced parallel reinforcing plates 40 which form a compartment adapted for the reception of tire repair tools or other tools for use on the vehicle.

The upstanding spaced parallel side walls are provided with inwardly directed flanges 42 which define smooth upper edges for the wall and over which a closure plate 43 extends. The closure plate prevents rain and dust from entering the space between the side walls and also serves as a closure for the tool compartment. The forward portion of the closure 43 which is carried by the movable section of the carrier is provided with a downwardly directed flange 44 to which the license tag 45 may be connected by means of suitable fastening devices 46. A tube 48 is extended through spaced parallel side walls 40 and forms a conduit for electric wires 49 adapted for connection with an electric lighting bulb for illuminating the license tag 45.

With reference to the foregoing description taken in connection with the accompanying drawings, it will be apparent that the tire carrier constructed in accordance with this invention may be readily and conveniently applied and when in use will not permit the tire to rattle and shake. Further, the tire may be readily removed since the movement of the hinged section releases one set of the spring tongues for the tire.

In the form of the invention illustrated in Figures 5 and 6, the annulus designated by the numeral 60 is of a width sufficient to accommodate two tires 61. In this form of the invention, the stationary section which is generally designated by the numeral 63 is provided adjacent one side wall 64 with springs tongues 65 which engages the sides of the metallic rim 66.

The tires 61 are supported in spaced relation to each other by means of a combined spacing and locking ring 66 having its outer side formed with a transversely extending arm 67 terminating in outwardly directed longitudinally curved spring tongues 68 corresponding in construction to the spring tongues 65. The transversely extending arms 67 are secured to the outer side of the ring by means of fastening pins 69 which extend beyond the inner surface of the ring and through openings 70 in the annulus 60. It is thus apparent that the pins 69 serve not only as a means for securing the transversely extending arms 67 to the ring, but as a means for anchoring the ring to the annulus. A second series of spring tongues 73 are secured to the hinge section 74 of the tire carrier so as to support the outer tire in spaced relation to the adjacent walls of the carrier.

Having thus described the invention what is claimed is:—

1. A tire casing comprising a pair of sections constituting a tire receiving chamber adapted for the reception of a plurality of tires, and a split spacing ring received in said chamber and having transversely extending arms terminating in outwardly directed tongues adapted for supporting tires in spaced relation to each other.

2. A tire casing comprising a pair of sections constituting a tire receiving chamber adapted for the reception of a plurality of tires, a split spacing ring received in said chamber and having transversely extending arms terminating in outwardly directed tongues adapted for supporting tires in spaced relation to each other, and means coacting with said split ring to support the tires in spaced relation to the sides of the casing.

3. The construction set forth in claim 1, said arms being provided with attaching pins permanently extended through said ring and terminating beyond the same for engagement with one of the sections whereby to hold the ring in position.

GEORGE W. STEWART.